(12) United States Patent
Goodman

(10) Patent No.: US 6,542,306 B2
(45) Date of Patent: Apr. 1, 2003

(54) COMPACT MULTIPLE CHANNEL MULTIPLEXER/DEMULTIPLEXER DEVICES

(75) Inventor: Timothy D. Goodman, Windsor, CA (US)

(73) Assignee: Optical Coating Laboratories, Inc., Santa Rosa, CA (US)

( * ) Notice: Subject to any disclaimer, the term of this patent is extended or adjusted under 35 U.S.C. 154(b) by 104 days.

(21) Appl. No.: 09/810,433

(22) Filed: Mar. 16, 2001

(65) Prior Publication Data

US 2002/0131180 A1 Sep. 19, 2002

(51) Int. Cl.[7] .............................................. G02B 27/14

(52) U.S. Cl. ....................................... 359/634; 359/629

(58) Field of Search ................................ 359/618, 629, 359/634, 636, 124, 127, 129, 130, 131, 627, 589

(56) References Cited

U.S. PATENT DOCUMENTS

| | | | |
|---|---|---|---|
| 4,244,045 A | | 1/1981 | Nosu et al. ..................... 370/3 |
| 4,441,784 A | | 4/1984 | Korth ........................... 385/39 |
| 4,449,782 A | | 5/1984 | Korth ........................... 385/24 |
| 4,482,994 A | | 11/1984 | Ishikawa ....................... 370/3 |
| 4,675,860 A | | 6/1987 | Laude et al. ................... 370/3 |
| 4,740,951 A | | 4/1988 | Lizet et al. .................... 370/3 |
| 4,824,200 A | | 4/1989 | Isono et al. ................... 385/24 |
| 4,993,796 A | | 2/1991 | Kapany et al. ............... 359/127 |
| 5,071,225 A | * | 12/1991 | Inoue ........................... 359/589 |
| 5,119,454 A | * | 6/1992 | McMahon .................... 359/290 |
| 5,808,763 A | | 9/1998 | Duck et al. .................. 359/127 |
| 5,943,456 A | | 8/1999 | Buckholz et al. ............ 385/24 |
| 6,005,718 A | * | 12/1999 | Park et al. ................... 359/627 |
| 6,008,920 A | | 12/1999 | Hendrix ...................... 359/127 |
| 6,072,633 A | * | 6/2000 | Park et al. ................... 359/634 |
| 6,075,632 A | * | 6/2000 | Braun ......................... 359/124 |
| 6,147,806 A | * | 11/2000 | Park et al. ................... 359/247 |
| 6,198,864 B1 | | 3/2001 | Lemoff et al. ................ 385/47 |
| 6,292,298 B1 | * | 9/2001 | Glance ........................ 359/583 |

FOREIGN PATENT DOCUMENTS

EP 1004907 5/2000

OTHER PUBLICATIONS

Ishio, H., Minowa, J. and Nosu, K., "*Review and Status of Wavelength–Division–Multiplexing Technology and Its Application,*" Journal of Lightwave Technology, vol. LT–2, No. 4, pp. 448–463, Aug. 1984.

Hendricks, H.D., "*A Four Channel 10–Nanometer Spacing Wavelength Demultiplexer,*" Fiber Optics Multiplexing and Modulation; Proceedings of Meeting, Arlington, VA, Apr. 7, 1983, SPIE 417, 5–11 (1983).

Hendricks, H.D., "*Wavelength Division Multiplexing,*" Fiber Optics Communications Technology, Proceedings of the Meeting, San Diego, CA, Aug. 23–24, 1984, SPIE 512, 130144 (1984).

Nosu, K., Ishio, K., and Hashimoto, K., "*Multireflection Optical Multi/Demultiplexer Using Interference Filters,*" Electronic Letters 15, 414–415 (1979).

(List continued on next page.)

Primary Examiner—Ricky Mack
(74) Attorney, Agent, or Firm—Workman Nydegger Seeley

(57) ABSTRACT

Multiple channel multiplexing/demultiplexing devices include an optically transparent optical block seated atop an optically transparent beam-directing member. The optical block includes a plurality of wavelength selective elements, a plurality of reflectors, and at least one imaging optical element. The beam-directing member includes a beam folding mirror and focusing lenses. When the devices are used as demultiplexers, a multi-channel beam is directed into the optical block and relayed in a zigzag pattern onto the wavelength selective elements, which separate selected wavelengths from the beam. The separated wavelengths propagate through the beam-directing member and are focused onto optical receptors.

61 Claims, 5 Drawing Sheets

OTHER PUBLICATIONS

Buckman, L., Lemoff, B., and Dolfi, D, "*A Low–Cost Compact Multimode/Singlemode WWDM Transceiver LAN,*" 2000 Electronic Components and Technology Conference, Sep. 2000, pp. 711–716.

Lemoff, B., Buckman, L., Schmit, A., and Dolfi, D., "*A Compact, Low–Cost WDM Transceiver for the LAN,*" 2000 Electronic Components and Technology Conference, Sep. 2000, pp. 711–716.

Lemoff, B., "*Tutorial: Technology Alternatives for 10 Gbit/sec LANS (Cat. E),*" Optical Fiber Communication, Mar. 8, 2000, 146–WI1–1.

Lemoff, B., "*Technology Alternatives for 10Gbit/s LANS,*" OFC 2000 Tutorials, Mar. 9, 2000, 100–124.

* cited by examiner

COMPACT MULTIPLE CHANNEL MULTIPLEXER/DEMULTIPLEXER DEVICES

BACKGROUND OF THE INVENTION

1. Field of the Invention

The present invention relates to multiple channel multiplexer/demultiplexer optical devices. In particular, the present invention relates to a compact demultiplexer device based on wide wavelength division multiplexer bandpass filters.

2. Background Technology

The increasing demand for bandwidth, coupled with the high cost of laying new optical fiber, has created a strong demand to find new and better ways to increase the carrying capacity on existing optical fiber. One such way to increase the capacity is by a technique called wavelength division multiplexing, which is the use of multiple wavelengths to carry multiple signal channels and thereby greatly increase the capacity of installed fiber optic networks.

Wavelength division multiplexing (WDM) technology has become a vital component of optical communication systems. In a WDM optical system, light from several lasers, each having a different central wavelength, is combined into a single beam that is introduced into an optical fiber. Each wavelength is associated with an independent data signal through the optical fiber. At the exit end of the optical fiber, a demultiplexer is used to separate the beam by wavelength into the independent signals. In this way, the data transmission capacity of the optical fiber is increased by a factor equal to the number of single wavelength signals combined into a single fiber.

Demultiplexing (DEMUX) devices are typically designed to selectively direct several channels from a single multiple-channel input beam into separate output channels. Multiplexing (MUX) devices are typically designed to provide a single multiple-channel output beam by combining a plurality of separate input beams of different wavelengths. A multiplexing/demultiplexing (MUX/DEMUX) device operates in either the multiplexing or demultiplexing mode depending on its orientation in application, i.e., depending on the choice of direction of the light beam paths through the device.

Thus, in a WDM system, optical signal channels are: (1) generated by light sources; (2) multiplexed to form an optical signal constructed of the individual optical signal channels; (3) transmitted over a single waveguide such as an optical fiber; and (4) demultiplexed such that each channel wavelength is individually routed to a designated receiver such as an optical detector.

In WDM systems, data carrying capacity is increased by adding optical channels. Conceptually, each wavelength channel in an optical fiber operates at its own data rate. In fact, optical channels can carry signals at different speeds. The use of WDM can push total capacity per fiber to hundreds of gigabytes per second. Generally, more space is required between wavelength channels when operating at 10 gigabytes per second than at 2.5 gigabytes per second, but the total capacities are nonetheless impressive. For example, in the case of 4 wavelength channels at a data rate per channel of 2.5 gigabytes per second, a total data rate of 10 gigabytes per second is provided. With 8 wavelength channels at a data rate per channel of 2.5 gigabytes per second, a total data rate of 20 gigabytes per second is provided. In fact, other wavelength channels can include, for example, 16, 32, 40, or more wavelength channels operating at 2.5 gigabytes per second or 10 gigabytes per second and allow much higher data transfer possibilities. Further, the use of multiple fibers in a single cable can provide even higher transmission rates. The 10 gigabit per second Ethernet standard (GbE) is particularly suited for this technology.

Generally, applications for MUX/DEMUX technology include long haul communications and local area data networks. Both digital and analog systems have been demonstrated for voice, data and video. The scope of applications for WDM devices ranges from spacecraft and aircraft applications to closed circuit and cable television systems. In view of these diverse applications, much effort has been expended toward developing WDM technology.

However, limitations due to crosstalk and channel separation have limited the use of MUX/DEMUX systems in data transfer such as in local area networks (LAN), metropolitan area networks (MAN), and wide area networks (WAN).

One solution to crosstalk and channel separation problems exists in wide wavelength division multiplexing (WWDM), which is an industry-defined term that indicates narrow bands of wavelengths that are spaced relatively far apart. Typically, the wavelength bands are about 10 nanometers (nm) wide and are spaced about 25 nm apart. The wavelength bands in WWDM are centered at about 1310 nm and typically include four channels at 1275 nm, 1300 nm, 1325 nm, and 1350 nm, each within about ±5 nm of the designated wavelength.

An advantage of the wide channel spacing in WWDM is that it requires no temperature control over the range of 0° C. to 70° C. This is because, although laser wavelengths drift by a few nanometers over the range of 0° C. to 70° C., WWDM's ~10 nm band width accommodates wavelength variations of ±5 nm. Therefore, WWDM is not particularly limited by temperature conditions.

Another advantage of WWDM is that no amplifiers are required because narrow spacing is unnecessary. The entire useful spectrum carried by a fiber can be covered if necessary. For example, as discussed hereinabove, up to 40 wavelength channels or more can be used. Nevertheless, when more than 4 wavelength bands, for example 8 or 16, are multiplexed, the demultiplexing needs become greater and the accompanying risk of excessive beam attenuation heightens.

Similarly, coarse wavelength division multiplexing (CWDM) is another industry-defined term and is an alternative solution to crosstalk and channel spacing problems. In CWDM systems, wavelength bands are about 10 nm wide and are spaced about 20 nm apart. The CWDM bands are centered at about 850 nm and typically include four channels at 800 nm, 820 nm, 840 nm, and 860 nm, each within about ±5 nm of the designated wavelength.

In contrast, dense wavelength division multiplexing (DWDM) has much narrower wavelength bands that are spaced closer together. Whereas DWDM is commonly used in telecommunications where the dense channel spacing is ideal, DWDM is normally incompatible with local network data transfer because the narrow channel spacing leads to excessive crosstalk that is unacceptable in data transfer applications. In DWDM systems, channel spacings of less than 1 nm are typically used, with wavelength bands centering around 1550 nm.

In the world of fiber optics, bulk optics are physical objects such as conventional lenses, mirrors and diffraction gratings. However, bulk optics do not have to be large. They can be engineered to be very small, on scale with optical fibers and associated light sources. Even when engineered to be small, however, such systems are still based on the same optical principles as larger bulk optics.

An example of a bulk optics demultiplexer is disclosed in U.S. Pat. No. 4,675,860 to Laude et al. (hereinafter "Laude"), which discloses a demultiplexer that utilizes a number of spherical interference filters that are arranged in series along an optical path of a beam of light that is emitted from an optical fiber. Each filter is selected to reflect a particular wavelength to a specific outlet fiber and transmit light of the other wavelengths to the next filter in the series. Each subsequent filter in the series is selected to reflect a different wavelength to a different outlet fiber.

Another example is U.S. Pat. No. 4,993,796 to Kapany et al. (hereinafter "Kapany"), which discloses modules for interfacing optical fibers. Kapany discloses the use of concave gratings and dichroic beam splitters to demultiplex multi-channel beams.

U.S. Pat. No. 6,008,920 to Hendrix (hereinafter "Hendrix") discloses a multiple channel MUX/DEMUX device that includes optical filters positioned in a zigzag pattern on a wedge shaped optically transparent block. Hendrix uses differing light incidence angles to alter the bandpass of identical filters.

Another example of a demultiplexer is disclosed in European Patent Application Publication No. EP100490782 to Lemoff et al. (hereinafter "Lemoff"). Lemoff discloses a demultiplexer that includes a unitary optically transparent structure that utilizes focusing/reflecting mirrors to relay a multi-wavelength beam of light among a series of wavelength specific bandpass filters with each filter separating out a specific wavelength component in the multi-wavelength beam. Lemoff disadvantageously uses complex, off-axis aspherical surfaces to initially direct the multi-wavelength beam of light onto the series of wavelength specific bandpass filters and reflecting mirrors.

Currently, conventional WDM multiplexer/demultiplexer devices suffer from many performance deficiencies while consuming a large portion of an optical system's attenuation loss budget. Such designs are often bulky and are difficult to design and fabricate accurately.

Accordingly, there is a need for improved MUX/DEMUX devices that avoid the drawbacks of conventional devices.

SUMMARY AND OBJECTS OF THE INVENTION

It is an object of the present invention to provide a multiplexer/demultiplexer device in which each optical surface therein can be produced within current standard molding tolerances.

It is another object of the invention to provide a multiplexer/demultiplexer device that is easy to mold and fabricate accurately.

Another object of the invention is to provide a multiplexer/demultiplexer device in which all surfaces are simple geometric forms and are easily accessible for measurement.

It is yet another object of the invention to provide a multiplexer/demultiplexer device that is easy to handle and assemble due to simple component geometries.

Another object of the invention is to provide a multiplexer/demultiplexer device that is easily scalable or modified.

It is a further object of the invention to provide a multiplexer/demultiplexer device that is easy to incorporate into other optical systems.

In order to achieve the forgoing objects and in accordance with the invention as embodied and broadly described herein, multiple channel multiplexing/demultiplexing devices are provided. In general, an optical multiplexer/demultiplexer device according to the invention comprises an input port for receiving a plurality of optical signal channels, and a plurality of output ports. Imaging optical elements such as imaging mirrors are provided for relaying a multi-wavelength beam of optical energy from the input port to at least one of the output ports along an optical axis. At least one wavelength selective reflector is provided in the device for receiving the beam of optical energy reflected from the imaging optical elements and transmitting one or more optical signal channels toward a first output port. The wavelength selective reflector is also configured to transmit one or more optical signal channels toward a second output port, and reflect a beam of optical energy for transmission of one or more optical signal channels at a third output port. At least one reflective surface is provided in the device for reflecting a beam of optical energy received from a first region of the wavelength selective reflector to a second region of the wavelength selective reflector.

Preferably, the operative portions of the reflective surface and one of the imaging mirrors are substantially co-linear. The imaging mirrors are preferably configured to afocally relay the beam of optical energy from the input port to at least one region of the wavelength selective reflector. In addition, at least one of the imaging mirrors preferably has a parabolic surface that comprises the vertex of a parabola, and the device of the invention is preferably configured such that its optical axis is not parallel to an axis of the parabolic surface. Further, the reflective surface can comprise at least one collimating reflector or at least one non-collimating reflector.

One embodiment of the present invention includes an optically transparent optical block seated atop an optically transparent beam-directing member. The optical block includes a plurality of wavelength selective elements, a plurality of reflectors, and at least one imaging optical element. The beam-directing member includes a beam folding mirror and focusing lenses.

More specifically, an optical demultiplexer device is provided that includes a transparent optical block having an upper surface defining a plane, and a lower surface. An imaging optical element is positioned on the upper surface of the optical block and is configured to direct a multi-wavelength beam of optical energy along a predetermined optical path. A plurality of wavelength selective elements are positioned below the upper surface of the optical block and are configured to receive the beam of optical energy. A plurality of reflectors on the upper surface of the optical block are configured in a substantially coplanar linear arrangement with the imaging optical element. The reflectors are positioned opposite from the wavelength selective elements such that each of the reflectors, as part of an imaging relay system, directs the beam of optical energy from one wavelength selective filter to an adjacent wavelength selective filter.

When the device of the invention is used as a demultiplexer, a multi-channel beam is directed into the optical block and relayed in a zigzag pattern onto the wavelength selective elements, which separate selected wavelengths from the beam. The separated wavelengths propagate through the beam-directing member and are focused onto optical receptors.

The foregoing objects and features of the present invention will become more fully apparent from the following description and appended claims, or may be learned by the practice of the invention as set forth hereinafter.

BRIEF DESCRIPTION OF THE DRAWINGS

In order to illustrate the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

Figure 1:
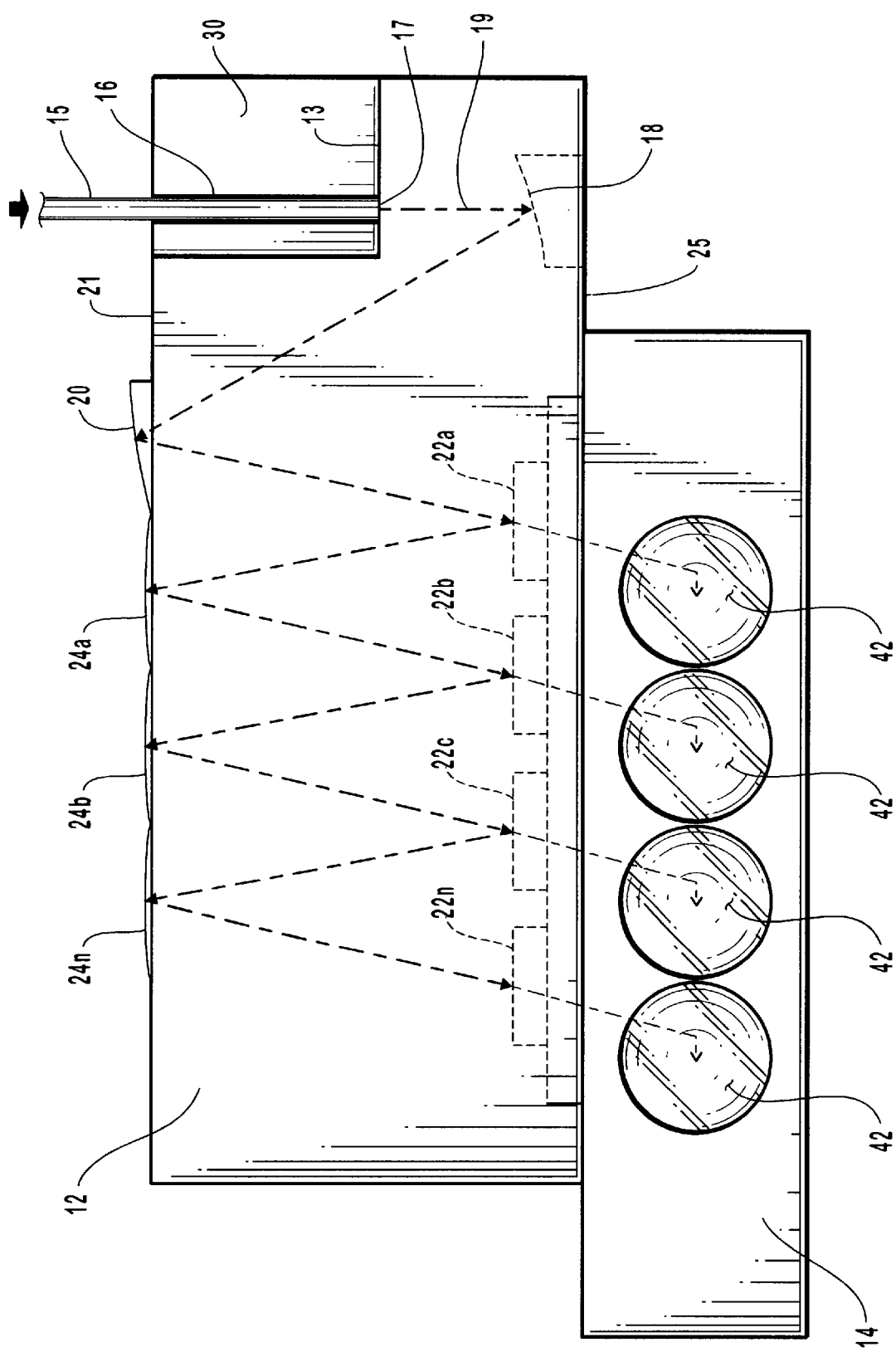
FIG. 1 is a side view of a demultiplexer device according to one embodiment of the invention.

The present invention is directed to multiple channel multiplexing/demultiplexing (MUX/DEMUX) devices, and in particular to compact multiple channel demultiplexer devices for use in optical fiber systems. The demulitpexer devices of the invention are particularly suited for use in wide wavelength division multiplexing (WWDM) systems.

A MUX/DEMUX device can operate in either or both directions depending on the direction of travel of light through the device. An optical demultiplexer device demultiplexes, i.e., spatially disburses, multiple wavelength light from a fiber optic waveguide or other optical source into the separate and different wavelength bands. Similarly, an optical multiplexer combines separate wavelength bands into a single multiple wavelength beam of light. Although, for simplicity and convenience, the demultiplexing functionality is predominantly focused upon in the discussion below, it will be appreciated that this focus is not to be construed as limiting, since the device of the invention may also operate as a multiplexer. Nevertheless, unless stated otherwise, for simplicity the remainder of the discussion will refer to the invention only in the demultiplexing sense.

In one embodiment, the demulitpexer device of the invention generally includes an optically transparent optical block seated atop an optically transparent beam-directing member. The optical block includes a plurality of wavelength selective elements such as optical interference filters, as well as a plurality of relay reflectors and at least one imaging optical element which provides an afocal relay system. The beam-directing member includes a beam-folding mirror and focusing lenses.

During operation of a demultiplexer device of the invention, a multi-channel optical energy beam is directed into the transparent optical block and onto the afocal relay system, which directs the beam along a predetermined optical path between the wavelength selective elements and reflectors in a zigzag pattern. The term "zigzag" as used herein refers to a series of short sharp turns in an optical path taken by a beam. Each wavelength selective element is preselected to pass a designated wavelength range and reflect both higher and lower wavelengths. The wavelength selective elements pass the separated wavelength bands into the beam-directing member where the beam-folding mirror directs the wavelength bands out of plane onto the focusing lenses, which focus the wavelength bands onto optical detectors or other optical relay systems.

The demultiplexer devices of the present invention can be formed with geometrically simple shapes and without complex off-axis surfaces. This allows for ease of fabrication, ease of metrology, and relatively simple incorporation into more complex optical systems. The simple geometries and design of the devices avoid the problem of optical surface misalignment, making current standard molding tolerances acceptable. Also, the simple component geometry allows the design to be easily scaled or modified. For example, the filter size, the degree of compactness, the imaging magnification, and the angle that incident light strikes the filters can all be easily modified.

Yet a further advantage is in the straightforward handling and assembly. The simple geometric forms of the invention make the optical surfaces easily definable and accessible for measurement and calibration. Additionally, individual pockets can be molded for each filter, making filter placement easy. In addition, the demultiplexer devices of the present invention are capable of processing data signals at 10 Gb/sec or faster.

Referring now to the drawings, wherein like structures are provided with like reference designations, the drawings only show the structures necessary to understand the present invention. FIG. 1 depicts a demultiplexer device 10 according to one embodiment of the present invention. The demultiplexer device 10 includes a monolithic optical element such as transparent optical block 12, which is seated atop a beam-directing member 14. The beam-directing member 14 is coupled to the output end of optical block 12 to direct and focus the wavelength channels that are output from optical block 12.

Figure 2:
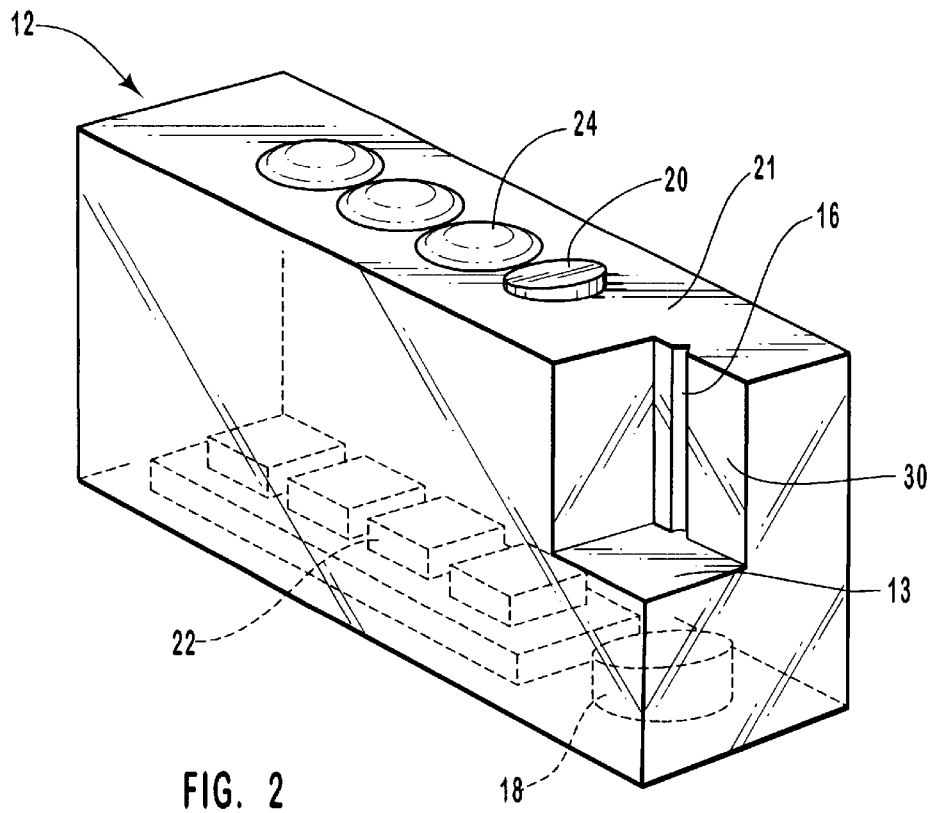
FIG. 2 is a perspective view of the transparent optical block component of the demultiplexer device of FIG. 1.
Figure 3:
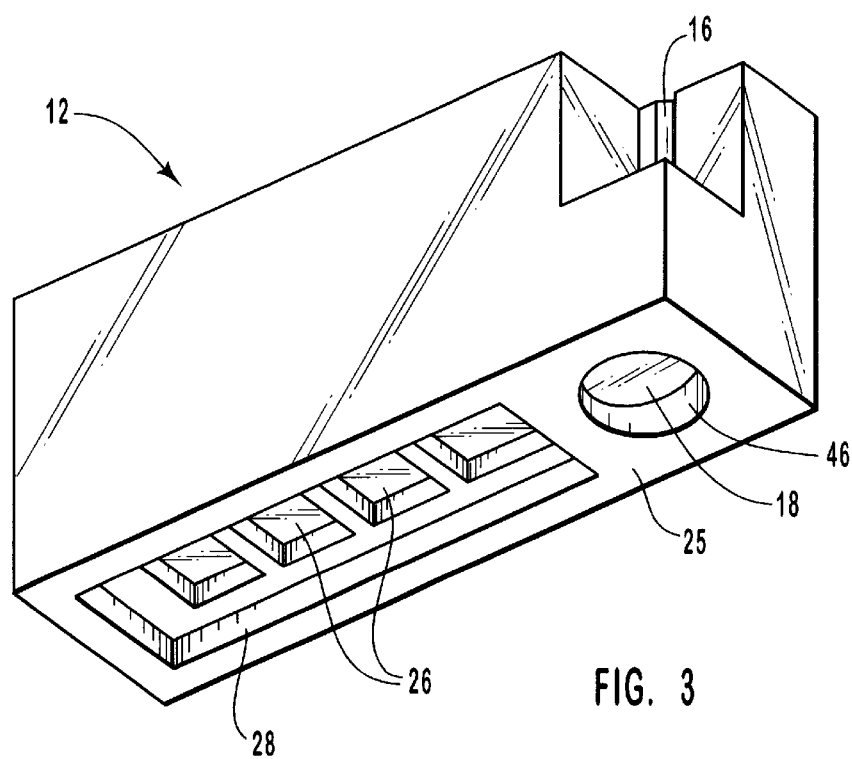
FIG. 3 is another perspective view of the transparent optical block component of the demultiplexer device of FIG. 1.
Figure 4:
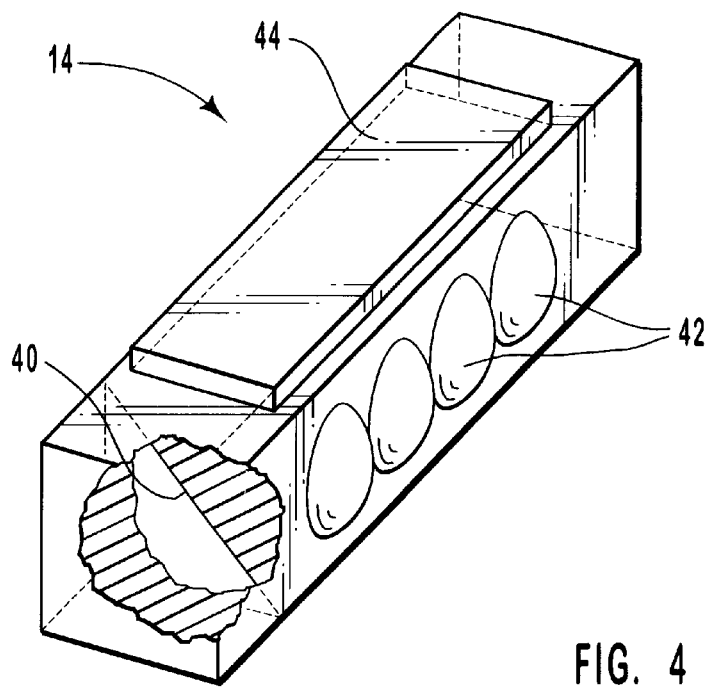
FIG. 4 is a perspective view of the beam-directing member component of the demultiplexer device of FIG. 1.
Figure 5:
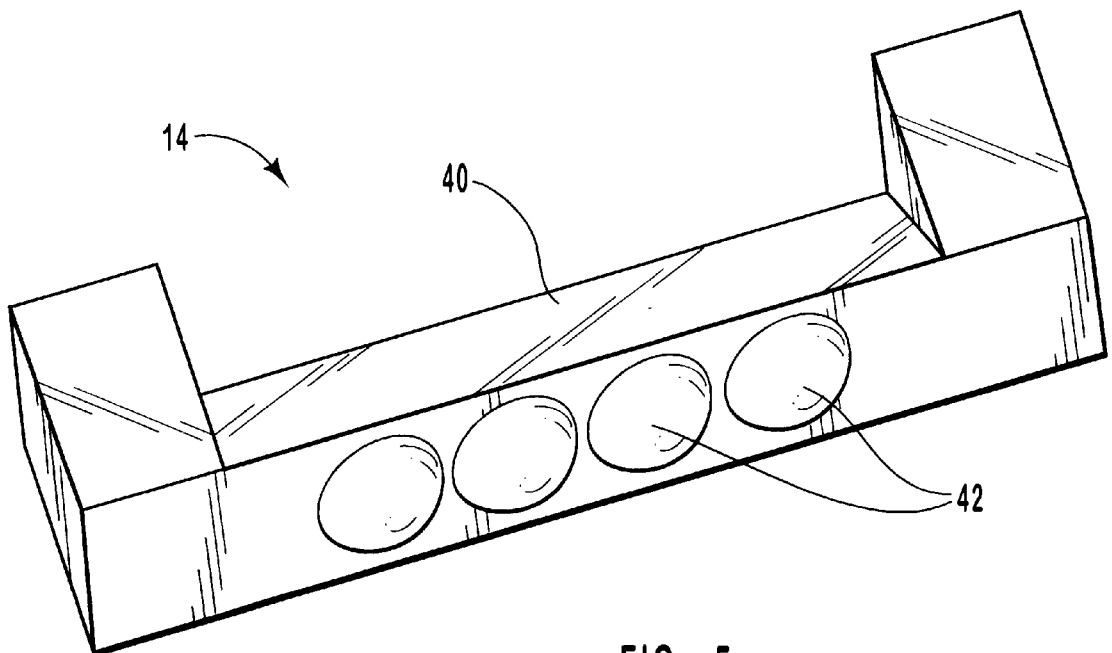
FIG. 5 is another perspective view of the beam-directing member component of the demultiplexer device of FIG. 1.

Perspective views of optical block 12 are shown in FIGS. 2 and 3, while perspective views of beam-directing member 14 are shown in FIGS. 4 and 5. Thus, some of the structures referenced in the discussion of FIG. 1 may also be found in the corresponding illustrations in FIGS. 2–5.

The optical block 12 and beam-directing member 14 are both preferably formed primarily of a monolithic material such as a molded plastic or glass material, and are optically transparent over the entire transmitted wavelength range. More preferably, both the optical block and the beam-directing member are formed of a moldable thermoplastic material. Such materials provide the advantage of allowing use of low cost injection molding fabrication techniques, facilitating high volume production at low cost. Further, it is preferable that both the optical block and beam-directing member be formed of the same material to reduce beam attenuation.

As illustrated in FIG. 1, optical block 12 has a generally rectangular shape and is configured to receive an optical signal through a waveguide such as an optical fiber 15. A groove 16 such as a fiber V-groove is provided in a large corner notch 30 of optical block 12 and is configured to hold optical fiber 15 in place. The corner notch 30 extends from the top side of optical block 12 downward to a corner surface area 13. The optical fiber 15 seated in groove 16 is configured to emit a multiwavelength beam of light from an output end 17 that abuts corner surface area 13. The optical fiber 15 acts as an input port for receiving a plurality of optical signal channels from an outside optical energy source.

In an alternative embodiment, the corner notch and groove in optical block 12 can be replaced with a molded ferule receptacle. The ferule receptacle is configured to receive a ferule terminated fiber waveguide for receiving a multi-wavelength beam of optical energy.

A first imaging optical element 18 is disposed in a lower portion of optical block 12 opposite from output end 17 of optical fiber 15. The optical element 18 is configured to direct a multi-channel optical energy beam 19 from optical fiber 15 along a predetermined optical path. As shown more clearly in FIG. 3, optical element 18 is preferably formed by a circular indentation 46 in a bottom surface 25 of optical block 12. The upper surface of indentation 46 is formed so as to appropriately function as optical element 18 and reflect the wavelengths incident thereupon. A second imaging optical element 20 is positioned on a top surface 21 of optical block 12 and is configured to receive beam 19 from optical element 18. In one embodiment, imaging optical elements 18, 20 are imaging mirrors.

Preferably, both of imaging optical elements 18, 20 have curved imaging surfaces that cause the imaging optical elements to have power. The imaging optical elements can be constructed to reflect light in a refractive and/or diffractive manner, and preferably are not constructed with flat surfaces. In addition, the imaging optical elements are preferably formed as molded curved surfaces in optical block 12. Further, in one embodiment, at least one of the imaging optical elements has a parabolic reflecting surface that comprises the vertex of a parabola, with the parabolic reflecting surface rotated about the vertex. Using parabolic reflecting surfaces provides an improved method to relay a wavelength beam in an off-axis path because the definable vertices of parabolic reflecting surfaces allow easy measurement for accuracy. Additionally, use of parabolic reflecting surfaces at low angles of incidence allows for a device that does not require exceptionally tight tolerances during manufacturing. Further, the device of the invention is preferably configured such that its optical axis is not parallel to an axis of the parabolic surface of an imaging optical element.

Optionally, imaging optical elements 18, 20 can have a reflective coating on the exterior surfaces thereof to improve their performance. For example, a metallic reflector can be formed by depositing an opaque metallic layer such as aluminum on the exterior surfaces of optical elements 18, 20. Another preferred reflective coating is an all-dielectric reflector. Typically, dielectric reflectors are more durable than metallic reflectors, but are limited in terms of bandwidth and are more sensitive to incidence angle. The reflective coating also may be deposited upon a substrate or multiple substrates and subsequently affixed to the exterior surfaces of the imaging optical elements in an optically continuous manner such as with an optical adhesive. Numerous other possible reflective materials, as well as their optimal thicknesses and methods of deposition are well known to those skilled in the optical arts and are encompassed by this invention.

A wavelength selective means for receiving a beam of optical energy and transmitting one or more optical signal channels toward one or more output ports is provided in device 10. The wavelength selective means can be provided in the form of at least one wavelength selective reflector, which can be constructed of one or more multilayer interference filters or diffractive optical elements. For example, the wavelength selective reflector can include a bandpass filter, a minus filter, an edge filter, and an interleaving filter. Other suitable examples for the wavelength selective reflector include graded index interference filters, diffractive structures such as fiber Bragg gratings, and the like.

A wavelength selective reflector is depicted in FIG. 1 in the form of a plurality of discrete wavelength selective elements 22a–22n such as wavelength selective interference filters. These filters are configured in a serial arrangement along a lower portion of optical block 12 that is indented from bottom surface 25. Preferably, the filters are arranged in a linear array with imaging optical element 18 and have a fixed center-to-center spacing therebetween.

The wavelength selective elements 22a–22n are configured in optical block 12 to receive beam 19 propagating along an optical path. The wavelength selective elements 22a–22n are each capable of transmitting a selected range of wavelengths within beam 19 and reflecting other wavelengths.

As shown, one preferred number of wavelength selective elements 22a–22n is four. Of course, one skilled in the art will recognize, in view of the disclosure herein, that a greater or lesser number of filters may be used, for example two, eight or sixteen, depending on the number of channels to be demulitplexed. The main limitations on the number of filters that can be used are the attenuation of the beam of light that will occur and the number of wavelength channels that can be multiplexed.

As illustrated in FIG. 3, receiving indentations 26 are molded into bottom surface 25 of optical block 12. The receiving indentations 26 are seated within a larger receiving aperture in the from of a rectangular groove 28, and are optionally linearly arranged with first imaging optical element 18 and with each other. This design allows for simple access to receiving indentations 26 for insertion of wavelength selective elements 22a–22n. Thus, during assembly of device 10, prefabricated wavelength selective elements 22a–22n are inserted into receiving indentations 26 and are affixed therein such as by an optical adhesive. Further, the simple geometries of optical block 12 allow for relatively simple scaling or redesign to incorporate filters of different sizes or shapes. The receiving indentations 26 also act as output ports for one or more optical signal channels that are transmitted through a respective wavelength selective element therein.

Alternatively, instead of discrete filter elements, the wavelength selective reflector can be a unitary structure such as a monolithic substrate having a linear variable filter (LVF) formed thereon. The LVF is an interference filter that is manufactured in such a manner that there is a controlled, non-uniformity of layer thickness from one end of the filter to the other. The LVF selectively transmits light in a linearly variable manner along the length thereof. The wavelength selective reflector can also be a monolithic substrate having a bandpass filter formed thereon with a pass band wavelength that is dependent upon an angle of incidence of a light beam.

When the wavelength selective reflector is one or more interference filters, such filters can be made by depositing a series of alternating thin film layers with different refractive indices, such as alternating layers of materials with a high and low refractive index. This structure generates wavelength selective effects that depend on the thickness of the layers, their refractive indices, the wavelength of light, and the angle at which the light strikes the thin film coating. The optical characteristics of interference filters are fixed, but the wavelengths selected depend on the angle at which light strikes the coating. Each wavelength selective interference filter has high transmission and low reflection over a particular range of wavelengths and low transmission and high reflection over another range of wavelengths. Thus, the desired wavelength selectivity can be controlled by proper selection of prefabricated filters and by control of light incidence angle.

In one embodiment, the wavelength selective elements used in the present invention are bandpass or "notch" filters that pass the selected wavelength band and completely reflect all other incident wavelength bands. In this way, beam attenuation is reduced and precise wavelength bands can be selected. Narrow bandpass filters that absorb a sufficiently small amount of the incident energy may be acceptable, depending on the net attenuation effects. The limiting factor is whether adequate optical energy reaches the output side of the demultiplexer device after all the attenuation effects have occurred.

Alternatively, the wavelength selective elements used in the present invention can be wide bandpass filters. Such filters provide high transmission in a specified bandpass and high reflection and/or absorption outside the specified bandpass. Wide bandpass filters are arbitrarily defined as filters transmitting a bandwidth of greater than about 10% of the center transmitted wavelength. For example, the bandwidths transmitted can range from about 20–90% of the center wavelength. Cuton and cutoff slopes of wide bandpass filters are preferably 6% or less, more preferably 3% or less.

In other embodiments, the wavelength selective elements can be dichroic filters, trichroic filters, long wavelength filters, or short wavelength filters. For example, each of wavelength selective elements 22a–22n can be a dichroic filter with a sequentially longer or shorter passband. In this embodiment, first wavelength selective element 22a transmits either a long or short wavelength range that includes only the first wavelength band to be isolated. The wavelength selective elements 22b–22n each pass sequentially longer or shorter wavelength ranges that include only one of the additional bands to be isolated. In this way, each wavelength channel can be separated and the entire multiwavelength beam demultiplexed.

A reflective means for reflecting a beam of optical energy received from a first region of the wavelength selective reflector to a second region of the wavelength selective reflector is also provided. The reflective means can be provided in the form of at least one reflective surface. The reflective surface can include discrete reflector elements, or can be a unitary reflector structure.

A reflective surface is depicted in FIGS. 1 and 2 in the form of a plurality of discrete reflectors 24a–24n that are positioned on top surface 21 of optical block 12 in a linear arrangement. The reflectors 24a–24n are positioned opposite from wavelength selective elements 22a–22n such that each of the reflectors directs beam 19 from one wavelength selective element to an adjacent wavelength selective element. Preferably, reflectors 24a–24n are configured in a substantially coplanar linear arrangement with imaging optical element 20.

The top surface 21 of optical block 12 defines a plane, with imaging optical element 20 and reflectors 24a–24n protruding slightly therefrom. The reflectors are located and shaped to produce the desired spatial and angular characteristics of a beam that propagates in a zigzag fashion between the wavelength selective elements and the reflectors.

As shown in FIG. 1, the reflective surface in the form of reflectors 24a–24n are configured on optical block 12 so as to be substantially parallel to the wavelength selective reflector in the form of wavelength selective elements 22a–22n. Alternatively, the reflective surface can be configured so as to not be parallel to the wavelength selective reflector. Preferably, the operative portions of the reflective surface and one of the imaging mirrors are substantially co-linear.

The reflective surface can comprise at least one collimating reflector or at least one non-collimating reflector. For example, reflectors 24a–24n can be converging lenses or mirrors, collimating lenses or mirrors, or simple reflecting surfaces. The reflectors are preferably convex spherical surfaces designed to relay the image of the fiber facet down the optical train. The spherical shape allows for relatively easy molding and measuring to check for fabrication errors. The reflectors are designed so that the demultiplexer device can be operated with a non-collimated light beam, with the reflectors controlling the tendency of such a beam to diverge. Thus, the device of the present invention can demultiplex small diameter non-collimated beams, allowing for a further reduction in size of the device.

Preferably, the reflectors have a reflective coating on the exterior surface thereof to improve their performance. The reflective coating can be formed of reflective metallic or dielectric materials such as discussed hereinabove for the optical imaging elements.

In an alternative embodiment, additional wavelength selective elements can be positioned opposite wavelength selective elements 22a–22n in place of the reflectors 24a–24n so as to reduce the number of reflections and accompanying wavelength attenuation in optical block 12. In this embodiment, a pair of beam-directing members can be positioned on opposing sides of the optical block to receive the isolated beams from the filters.

FIG. 4 shows further details of beam-directing member 14 of device 10. The beam-directing member 14 is coupled to optical block 12 and is configured to redirect and focus the optical energy transmitted through wavelength selective elements 22a–22n. The beam-directing member 14 includes a beam-folding mirror 40, a plurality of focusing lenses 42, and a coupling protrusion 44.

The beam-directing member 14 and optical block 12 have interconnecting means that allow the two to be coupled with precision. For example, rectangular groove 28 of optical block 12 can be configured to receive coupling protrusion 44 of beam-directing member 14. The coupling protrusion 44 can be molded contiguously with the main body portion of beam-directing member 14 so as to fit snugly into rectangular groove 28.

Although coupling protrusion 44 and groove 28 in optical block 12 are illustrated as rectangular, it should be understood that other shapes such as ovals or jagged edge rectangles would also function adequately. Of course, one skilled in the art will recognize, in light of the disclosure herein, that other interconnecting means may also be used such as v-groove alignment features, molded alignment pins, etc.

An optically transparent adhesive should be used to bond optical block 12 to beam-directing member 14. The adhesive may be applied on all adjoining surfaces in such a manner that the beam-directing member is attached to the optical block and all exposed surfaces are index-matched to reduce beam attenuation. Preferred adhesive materials include UV-curable optical adhesives.

As illustrated in FIGS. 4 and 5, beam-folding mirror 40 is formed as an inclined surface. Selected wavelength bands that pass into beam-directing member 14 are reflected off the inclined surface of mirror 40 and are redirected towards focusing lenses 42. In one embodiment, the inclined surface of mirror 40 is configured so that the selected wavelength beams are reflected by total internal reflection (TIR) and are deviated by about a 90° angle with respect to the optical path of the beams exiting the wavelength selective elements.

The beam-folding mirror 40 can have a reflective coating on the exterior surface thereof such as a reflective metallic or dielectric material as discussed hereinabove for the imaging optical elements. For example, beam-folding mirror 40 can be formed by applying a reflective coating of a metallic material to the inclined surface on the underside of beam-directing member 14.

Alternatively, it may be desirable in some embodiments to not bend the isolated wavelength beams. In this case mirror 40 can be eliminated from beam-directing member 14. The emitted wavelength beams would then be transmitted to the focusing lenses directly without being bent by reconfiguring the focusing lenses to be in the direct optical path of the beams exiting the filters.

A variety of lens structures can be used for focusing lenses 42 of beam-directing member 14. For example, lenses 42 can be convex aspheric lenses, with the convex portion facing outward from beam-directing member 14. The lenses 42 can be formed as molded surfaces on beam-directing member 14, or can be optical implants such as GRIN lenses or micro-lenses. The lenses 42 preferably have fixed center-to-center spacing between them, corresponding to the center-to-center spacing between the wavelength selective elements. Each of lenses 42 can focus a selected wavelength beam onto a corresponding optical receiver such as an optical detector, optical fiber for further transmission of the signal, or other optical receptor, depending upon the particular application.

The required specifications for the output beam are determined by the characteristics of the optical detector such as a high-speed detector or the core diameter of the receiving fiber. Thus, the focusing lenses are selected or designed so that the output beam meets the requirements of the detector or receiving fiber.

During operation of demultiplexer device 10, the demultiplexing of multiple channel beams is carried out as follows. A multi-wavelength optical beam 19 is emitted from output end 17 of optical fiber 15, enters optical block 12, and is incident upon the center of first imaging optical element 18. The multi-wavelength beam 19 is afocally reflected to second imaging optical element 20 by first imaging optical element 18. The beam 19 incident upon optical element 20 is reflected towards wavelength selective element 22a. Thus, imaging optical elements 18 and 20 are coordinated to afocally relay light emitted from output end 17 onto the surface of wavelength selective element 22a.

Although the imaging optical elements do not collimate the incident light since the fiber output is an extended source, the convex surfaces of the imaging optical elements control the tendency of non-collimated light to diverge and help maintain the beam strength.

As will be described in greater detail hereinafter, selected wavelengths incident upon wavelength selective element 22a pass therethrough while the remainder are reflected or absorbed. The reflected wavelengths are directed to reflector 24a, which reflects the light incident thereupon towards wavelength selective element 22b, which in turn passes a selected band of wavelengths and reflects the remainder to a subsequent reflector 24b. Incident light on reflector 24b is relayed to wavelength selective element 22c, which transmits its preselected wavelengths and reflects the remainder to reflector 24n, which reflects the light to the final wavelength selective element 22n. This process may be continued when additional channels are utilized in the multiple channel beam by adding additional wavelength selective elements and reflectors to demultiplexer device 10 as needed. While the reflectors may optionally be identical, the wavelength selective elements vary depending upon the desired transmitted wavelengths. The light beam incident on each of the wavelength selective elements is preferably at an angle of about 0 to about 15 degrees. Coordinating designed light incident angles with known wavelength selective elements allows the selection of the appropriate wavelength selective elements to ensure the proper wavelength transmittance.

The selected wavelength beams that pass through wavelength selective elements 22a–22n enter beam-directing member 14 and pass to beam-folding mirror 40. The beam-folding mirror 40 bends the wavelength beams and redirects them towards the series of focusing lenses 42. In one embodiment, the selected wavelength beams are bent at an angle of 90° by mirror 40 which has an incline of 45°. Each of lenses 42 then focus a selected wavelength beam onto a corresponding optical receiver.

In one embodiment of the invention, the demultiplexer device of the invention is configured for use in a four-channel WDM system with channels centered around 1310 nm. For example, the four channels can be 1275 nm, 1300 nm, 1325 nm, and 1350 nm. Alternatively, the channels can be centered around 850 nm with the four channels at 800 nm, 820 nm, 840 nm, and 860 nm. In a further embodiment, the channels can be centered around 1550 nm. One skilled in the art will recognize that although the demultiplexer device shown in the drawings is a four channel demultiplexer, more or fewer channels can be demultiplexed by adding or subtracting filters and reflectors in the device. There are, however, some limitations on the number of wavelength channels that can be demultiplexed. For example, the signals cannot be so close in wavelength that there is unacceptable crosstalk.

Figure 6:
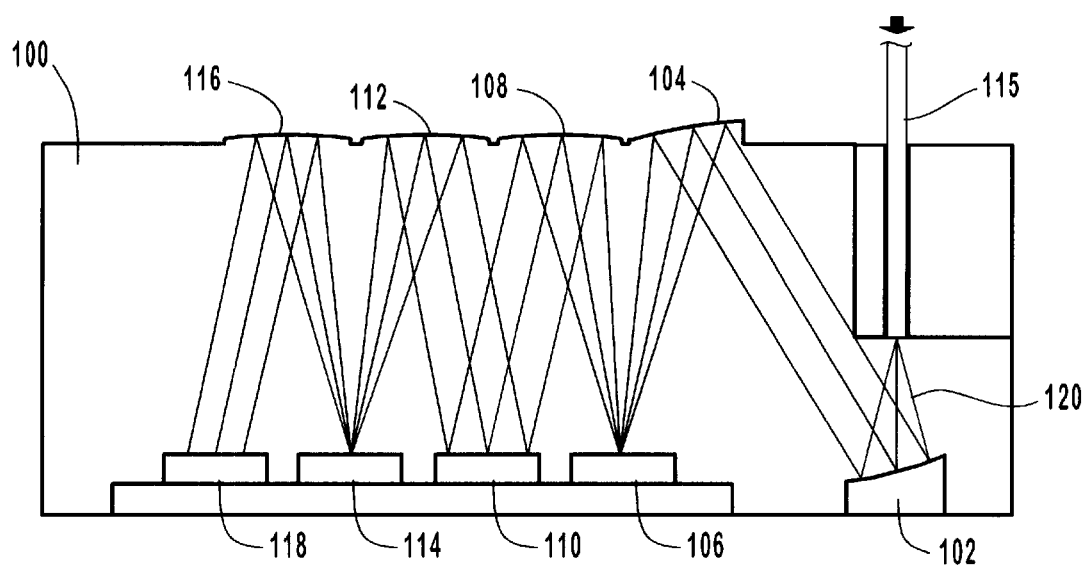
FIG. 6 shows a ray diagram of the path and shape of a light beam in one embodiment of the transparent optical block of the invention.
Figure 7:
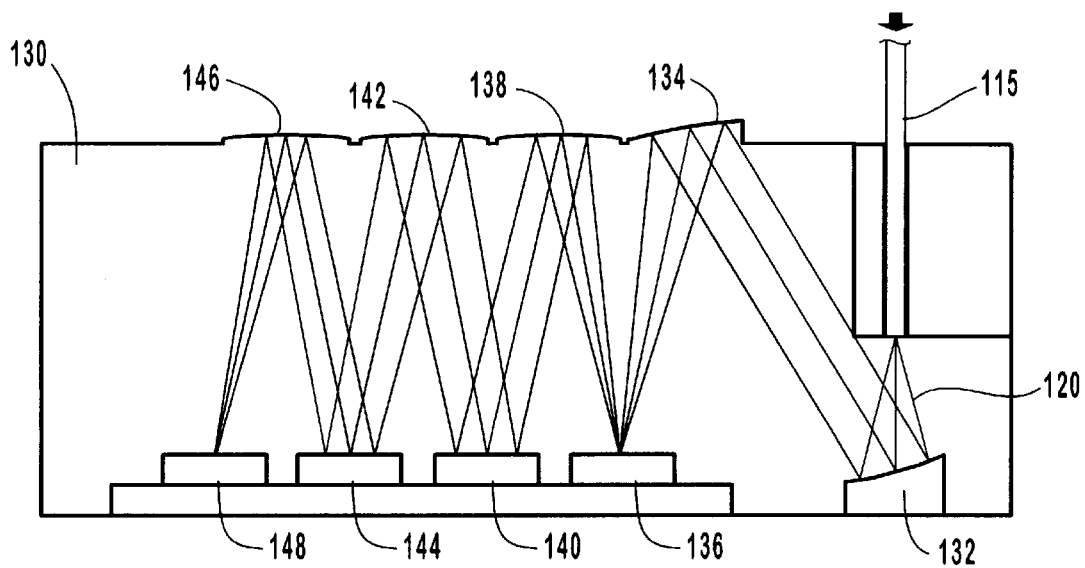
FIG. 7 shows a ray diagram of the path and shape of a light beam in another embodiment of the transparent optical block of the invention.
Figure 8:
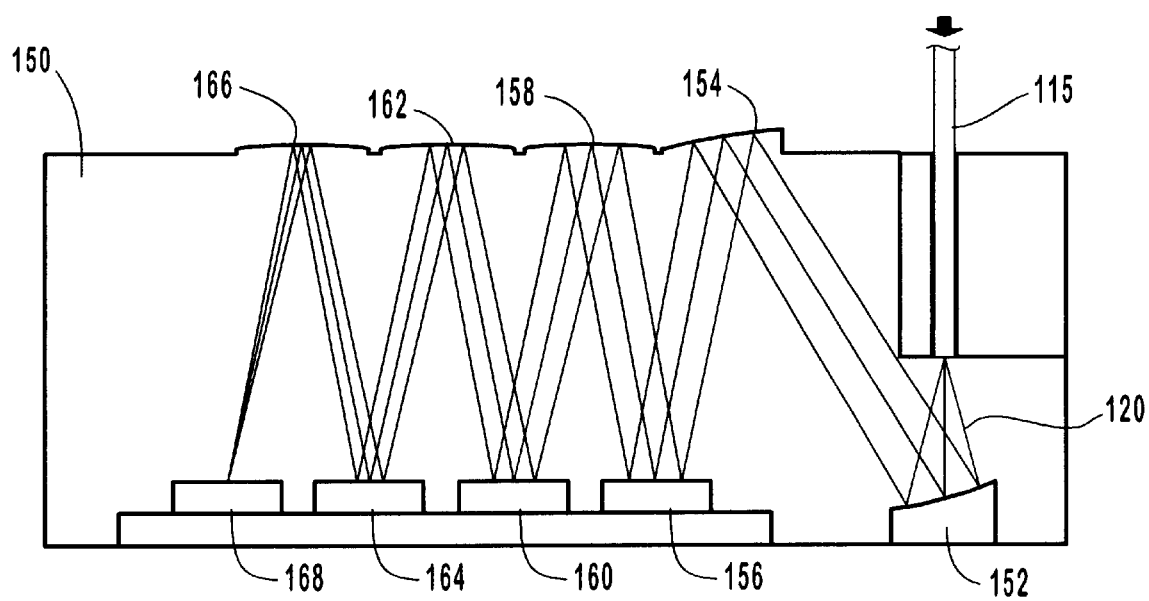
FIG. 8 shows a ray diagram of the path and shape of a light beam in a further embodiment of the transparent optical block of the invention.

Referring now to FIGS. 6–8, various alternative embodiments of the optical block used in the demultiplexer device of the invention are shown. FIGS. 6–8 also show ray diagrams of the path and shape of a light beam in each of these embodiments. As described in further detail below, these embodiments employ different types of reflectors in order to change the shape of the light beam propagating through the optical block. While not shown, it should be understood that a beam-directing member can be coupled to the optical blocks as shown in the device of FIG. 1. One skilled in the art will recognize, in view of the disclosure herein, that more or less filters and reflectors can be used in the optical blocks of FIGS. 6–8 to vary the number of optical channels that can be separated.

FIG. 6 depicts a transparent optical block 100 that is similar to optical block 12 described previously. Hence, optical block 100 includes imaging optical elements 102 and 104, as well as a series of wavelength selective elements that isolate selected wavelength channels and a series of opposing reflectors. The optical block 100 in particular employs different types of reflectors in order to change the shape of the light beam propagating therethrough. Thus, optical block 100 includes a collimating reflector 108, a converging reflector 112, and a collimating reflector 116.

During operation of a demultiplexer of the invention having optical block 100, a multi-channel optical energy beam 120 enters optical block 100 from an optical fiber 115 and is reflected off of imaging element 102 toward imaging element 104, which convergingly directs the beam 120 to a first wavelength selective filter 106. The portion of beam 120 that is not transmitted by filter 106 is reflected divergently to collimating reflector 108, which collimates the incident optical energy and relays it to a second filter 110. The filter 110 reflects the portion of the collimated beam that is not transmitted onto converging reflector 112, which focuses the beam onto a third filter 114. The filter 114 reflects the portion of the beam that is not transmitted onto collimating reflector 116, which collimates the beam and relays it to a fourth filter 118.

FIG. 7 depicts a transparent optical block 130 that is similar to optical block 12 described previously. Hence, optical block 130 includes imaging optical elements 132 and 134, as well as a series of wavelength selective elements and a series of opposing reflectors. The optical block 130 employs different types of reflectors including a non-converging reflector 138, a converging reflector 142, and a non-converging reflector 146.

During operation of a demultiplexer having optical block 130, a multi-channel optical energy beam 120 enters optical block 130 from an optical fiber 115 and is reflected off of imaging element 132 toward imaging element 134, which convergingly directs the beam 120 to a first wavelength selective filter 136. The portion of beam 120 that is not transmitted by filter 136 is reflected divergently to reflector 138, which relays the beam to a second filter 140. The filter 140 reflects the portion of the beam that is not transmitted onto converging reflector 142, which directs the beam in a gradually converging manner onto a third filter 144, to reflector 146, and onto a fourth filter 148.

FIG. 8 depicts a transparent optical block 150 which is similar to optical block 12 described previously. Hence, optical block 150 includes imaging optical elements 152 and 154, as well as a series of wavelength selective elements and a series of opposing reflectors. In this embodiment, the reflectors are all non-converging reflectors.

During operation of a demultiplexer having optical block 150, a multi-channel optical energy beam 120 enters optical block 150 from an optical fiber 115 and is reflected off of imaging element 152 toward imaging element 154, which convergingly directs the beam 120 to a first wavelength selective filter 156. The imaging element 154 converges the beam so that it is eventually focused onto a fourth filter 168. Thus, the beam is reflected without any additional converging, diverging, or collimating by reflectors 158, 162, and 166 toward corresponding filters 160, 164, and 168.

Persons of skill in the art will appreciate that the correlative multiplexing functionality is readily achieved for any of the above-described embodiments by reversing the direction of operation such that separate channels are combined to form a multiple channel signal. For example, when the embodiment shown in FIG. 1 is used as a WDM multiplexer, single wavelength beams of light are input into the beam-directing member 14 and are relayed to wavelength selective elements 22a–22n. The wavelength selective elements 22a–22n pass the input wavelengths, which are combined together within optical block 12 to produce a multi-wavelength beam, which is directed into optical fiber 15 by imaging optical elements 20 and 18.

Further, it is possible to use WDM to send signals at two different wavelengths in opposite directions through the same fiber. Wavelength selective couplers at each end separate the signals going in opposite directions. This is typically not done in high performance systems because it invites noise problems. However, it is possible if the wavelengths are widely separated. For example, applications such as low speed transmission in one direction and high speed transmission in the other are possible. Thus, the device of the present invention may be used to transmit signals at different wavelengths in opposing directions.

The device according to the present invention is capable of use with both single-mode fiber applications and multi-mode fiber applications. The main limitation for the development of single-mode fiber applications is the development of better control of molding tolerances. However, it is anticipated that as molding techniques improve, the desirability of operating the present invention in single mode will increase. This is due to the advantageous higher bandwidths and lower attenuation that exist with single mode fibers.

As previously stated, the demultiplexer devices of the present invention advantageously can be formed with geometrically simple shapes and without complex off-axis surfaces. The option of making one or all of the reflectors non-converging mirrors can further simplify the invention and reduce the complexity of the design. Thus, the present simple design makes current standard molding tolerances acceptable, makes redesign or scaling easier, and makes it easier for end users to incorporate the device into other, more complex designs.

The present invention may be embodied in other specific forms without departing from its spirit or essential characteristics, and the described embodiments are to be considered in all respects only as illustrative and not restrictive. Thus, although the present invention has been described in considerable detail with reference to certain preferred embodiments thereof, other embodiments are also possible. For example, while the present device is preferably used as a demultiplexer device, it should be understood that the claims are intended to cover both demultiplexing and multiplexing functionalities, where an input port becomes an output port for optical signal channels arriving through any of the output ports which correspondingly function as input ports.

The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An optical multiplexer/demultiplexer device, comprising:

an input port for receiving a plurality of optical signal channels;

a first output port;

a second output port;

a third output port;

two or more imaging optical elements for relaying a multi-wavelength beam of optical energy from the input port to at least one of the output ports along an optical axis;

at least one wavelength selective reflector for receiving the beam of optical energy from the imaging optical elements and transmitting one or more optical signal channels toward the first output port;

at least one reflective surface for reflecting a beam of optical energy received from a first region of the wavelength selective reflector to a second region of the wavelength selective reflector, wherein the wavelength selective reflector:

transmits one or more optical signal channels toward the second output port; and reflects a beam of optical energy for transmission of one or more optical signal channels at the third output port.

2. The device of claim 1, wherein the imaging optical elements are imaging mirrors.

3. The device of claim 2, wherein the operative portions of the at least one reflective surface and one of the imaging mirrors are substantially co-linear.

4. The device of claim 3, wherein at least one of the imaging mirrors has a parabolic surface.

5. The device of claim 4, wherein the parabolic surface comprises the vertex of a parabola.

6. The device of claim 4, wherein the optical axis is not parallel to an axis of the parabolic surface.

7. The device of claim 1, wherein the reflective surface and the wavelength selective reflector are opposite each other.

8. The device of claim 1, wherein the reflective surface and the wavelength selective reflector are formed on opposing surfaces of a monolithic optical element.

9. The device of claim 8, wherein the monolithic optical element comprises molded plastic.

10. The device of claim 1, wherein the reflective surface comprises at least one collimating reflector.

11. The device of claim 1, wherein the reflective surface comprises at least one non-collimating reflector.

12. The device of claim 2, wherein the imaging mirrors afocally relay the beam of optical energy from the first input port to at least one region of the wavelength selective reflector.

13. The device of claim 1, wherein the reflective surface is substantially parallel to the wavelength selective reflector.

14. The device of claim 1, wherein the reflective surface is not parallel to the wavelength selective reflector.

15. The device of claim 1, wherein the wavelength selective reflector comprises a series of discrete wavelength selective elements.

16. The device of claim 15, wherein at least one of the discrete wavelength selective elements is an optical interference filter.

17. The device of claim 1, wherein the wavelength selective reflector comprises a monolithic substrate having a linear variable filter.

18. The device of claim 1, wherein the wavelength selective reflector comprises a monolithic substrate having a bandpass filter with a pass band wavelength that is dependent upon an angle of incidence.

19. The device of claim 1, wherein the wavelength selective reflector comprises an optical interference filter selected from the group consisting of a bandpass filter, a minus filter, an edge filter, and an interleaving filter.

20. An optical multiplexer/demultiplexer device, comprising:

an input port for receiving a plurality of optical signal channels;

a first output port;

a second output port;

a third output port;

two or more imaging mirrors having parabolic surfaces that comprise at least one vertex of a parabola for relaying a multi-wavelength beam of optical energy from the input port to at least one of the output ports along an optical axis;

at least one wavelength selective reflector for receiving the beam of optical energy reflected from the imaging mirrors and transmitting one or more optical signal channels toward the first output port;

at least one reflective surface for reflecting a beam of optical energy received from a first region of the wavelength selective reflector to a second region of the wavelength selective reflector, wherein the wavelength selective reflector:

transmits one or more optical signal channels toward the second output port; and reflects a beam of optical energy for transmission of one or more optical signal channels at the third output port.

21. The device of claim 20, wherein the optical axis is not parallel to an axis of the parabolic surfaces.

22. The device of claim 20, wherein the operative portions of the wavelength selective reflector and imaging mirrors are substantially co-linear.

23. The device of claim 20, wherein the reflective surface and the wavelength selective reflector are opposite each other.

24. The device of claim 20, wherein the reflective surface and the wavelength selective reflector are formed on opposing surfaces of a monolithic optical element.

25. The device of claim 24, wherein the monolithic optical element comprises molded plastic.

26. The device of claim 20, wherein the reflective surface comprises at least one collimating reflector.

27. The device of claim 20, wherein the reflective surface comprises at least one non-collimating reflector.

28. The device of claim 20, wherein the imaging mirrors afocally relay the beam of optical energy from the first input port to at least one region of the wavelength selective reflector.

29. The device of claim 20, wherein the reflective surface is substantially parallel to the wavelength selective reflector.

30. The device of claim 20, wherein the reflective surface is not parallel to the wavelength selective reflector.

31. The device of claim 20, wherein the wavelength selective reflector comprises a series of discrete wavelength selective elements.

32. The device of claim 31, wherein at least one of the discrete wavelength selective elements is an optical interference filter.

33. The device of claim 20, wherein the wavelength selective reflector comprises a monolithic substrate having a linear variable filter.

34. The device of claim 20, wherein the wavelength selective reflector comprises a monolithic substrate having a bandpass filter with a pass band wavelength that is dependent upon an angle of incidence.

35. The device of claim 20, wherein the wavelength selective reflector comprises an optical interference filter selected from the group consisting of a bandpass filter, a minus filter, an edge filter, and an interleaving filter.

36. An optical demultiplexer device, comprising:

a transparent optical block having an upper surface defining a plane, and a lower surface;

a first imaging optical element disposed in a lower portion of the optical block and configured to direct a beam of optical energy along a predetermined optical path;

a second imaging optical element on the upper surface of the optical block and configured to receive the beam of optical energy from the first imaging optical element;

a plurality of wavelength selective elements below the upper surface of the optical block and configured to receive the beam of optical energy propagating along the optical path, each of the wavelength selective elements capable of transmitting a selected range of wavelengths within the beam of optical energy and reflecting other wavelengths; and a plurality of reflectors on the upper surface of the optical block and configured in a substantially coplanar linear arrangement with the second imaging optical element, the reflectors positioned opposite from the wavelength selective elements such that each of the reflectors directs the beam of optical energy from one wavelength selective element to an adjacent wavelength selective element.

37. The demultiplexer device of claim 36, further comprising a beam-directing member coupled with the optical block along the lower surface for redirecting and focusing the optical energy transmitted through the wavelength selective elements.

38. The demultiplexer device of claim 37, wherein the beam-directing member comprises:

a beam folding mirror configured to redirect beams of optical energy at an angle from their previous path; and a plurality of focusing lenses configured to receive the redirected beams of optical energy and focus each of the beams of optical energy on an optical receiver.

39. The demultiplexer device of claim 37, wherein the optical block and the beam-directing member are coupled through a coupling protrusion on the beam-directing member which is inserted into a corresponding receiving aperture in the lower surface of the optical block.

40. The demultiplexer device of claim 36, wherein the optical block has a corner notch with a groove that is configured to hold an input waveguide for receiving a multi-wavelength beam of optical energy.

41. The demultiplexer device of claim 36, wherein the optical block has a molded ferule receptacle to receive a ferule terminated fiber waveguide for receiving a multi-wavelength beam of optical energy.

42. The demultiplexer device of claim 40, wherein the waveguide extends below the plane of the upper surface.

43. The demultiplexer device of claim 40, wherein the waveguide is an optical fiber.

44. The demultiplexer device of claim 36, wherein the wavelength selective elements comprise bandpass filters.

45. The demultiplexer device of claim 36, wherein the wavelength selective elements comprise dichroic filters or trichroic filters.

46. The demultiplexer device of claim 36, wherein at least one of the reflectors is a converging reflector.

47. The demultiplexer device of claim 36, wherein at least one of the reflectors is a collimating reflector.

48. The demultiplexer device of claim 36, wherein all of the reflectors are non-converging reflectors.

49. An optical demultiplexer device, comprising:

a transparent optical block having an upper surface defining a plane and a lower portion adjacent to a lower surface;

a first imaging optical element disposed in the lower portion of the optical block opposite from an input waveguide and configured to direct a beam of optical energy from the input waveguide along a predetermined optical path;

a second imaging optical element on the upper surface of the optical block and configured to receive the beam of optical energy from the first imaging optical element;

a plurality of wavelength selective filters disposed in the lower portion of the optical block and configured to receive the beam of optical energy propagating along the optical path, each of the wavelength selective filters capable of transmitting a selected range of wavelengths within the beam of optical energy and reflecting other wavelengths;

a plurality of reflectors on the upper surface of the optical block and configured in a substantially coplanar linear arrangement with the second imaging optical element, the reflectors positioned opposite from the wavelength selective filters such that each of the reflectors directs the beam of optical energy from one wavelength selective filter to an adjacent wavelength selective filter; and a beam-directing member coupled to the optical block and configured to redirect and focus the optical energy transmitted through the wavelength selective filters.

50. The demultiplexer device of claim 49, wherein the beam-directing member comprises:

a beam folding mirror configured to redirect beams of optical energy at an angle from their previous path; and a plurality of focusing lenses configured to receive the redirected beams of optical energy and focus each of the beams of optical energy on an optical receiver.

51. The demultiplexer device of claim 49, wherein the optical block and the beam-directing member are coupled through a coupling protrusion on the beam-directing member which is inserted into a corresponding receiving aperture in the lower surface of the optical block.

52. The demultiplexer device of claim 49, wherein the optical block has a corner notch extending below the plane of the upper surface, the corner notch having a groove that is configured to hold an input waveguide for receiving a multi-wavelength beam of optical energy.

53. The demultiplexer device of claim 49, wherein the optical block has a molded ferule receptacle to receive a ferule terminated fiber waveguide for receiving a multi-wavelength beam of optical energy.

54. The demultiplexer device of claim 52, wherein the waveguide is an optical fiber.

55. The demultiplexer device of claim 49, wherein the wavelength selective filters are bandpass filters.

56. The demultiplexer device of claim 49, wherein the wavelength selective filters are dichroic filters or trichroic filters.

57. The demultiplexer device of claim 49, wherein the wavelength selective filters are configured in a substantially linear arrangement with the first imaging optical element.

58. The demultiplexer device of claim 49, wherein at least one of the reflectors is a converging reflector.

59. The demultiplexer device of claim 49, wherein at least one of the reflectors is a collimating reflector.

60. The demultiplexer device of claim 49, wherein all of the reflectors are non-converging reflectors.

61. An optical multiplexer/demultiplexer device, comprising:

one or more input ports for receiving a plurality of optical signal channels;

one or more output ports for transmitting a plurality of optical signal channels;

at least two imaging optical elements for relaying a beam of optical energy from the one or more input ports to the one or more output ports;

wavelength selective means for receiving a beam of optical energy and transmitting one or more optical signal channels toward the one or more output ports; and reflective means for reflecting a beam of optical energy received from a first region of the wavelength selective means to a second region of the wavelength selective means.

\* \* \* \* \*